UNITED STATES PATENT OFFICE.

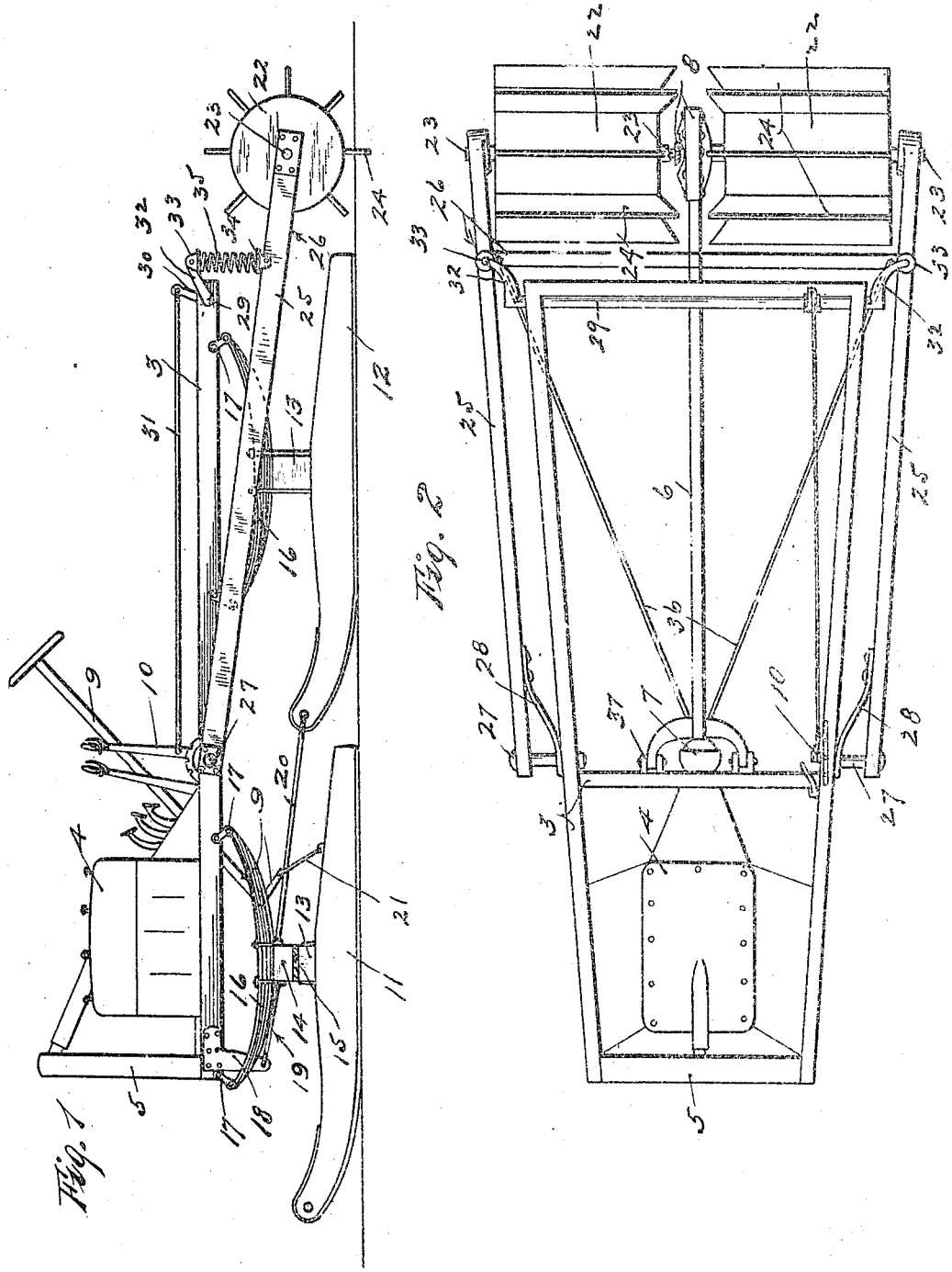

HENRY SMEDSHAMMER, OF LITCHVILLE, NORTH DAKOTA.

MOTOR-PROPELLED SLED.

1,293,958.

Specification of Letters Patent.   Patented Feb. 11, 1919.

Application filed September 23, 1918. Serial No. 255,353.

*To all whom it may concern:*

Be it known that I, HENRY SMEDSHAMMER, a citizen of the United States, residing at Litchville, in the county of Barnes and State of North Dakota, have invented certain new and useful Improvements in Motor-Propelled Sleds; and I do hereby declare the following to be a full, clear, and exact description of the invention, such as will enable others skilled in the art to which it appertains to make and use the same.

My invention has for its object to provide an extremely simple and highly efficient motor-propelled sled; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a side elevation of the invention; and

Fig. 2 is a plan view of the same with some parts removed.

In carrying out the invention, I preferably, but not necessarily, use a complete Ford automobile, with the exception of the running gear, and spring-mount the same on an ordinary bob sled. In the drawings, this idea has been carried out, with the exception that the automobile and bob sled have been stripped of all parts that are not essential to the illustration of the invention. Of the parts of the automobile illustrated, it is only necessary to note the frame 3, engine 4, radiator 5, engine driving shaft 6, universal joint 7, transmission mechanism 8, hand-wheel-equipped steering post 9, and latch lever 10.

Referring now to the bob sled, the numerals 11 and 12 indicate, respectively, the front and rear runners thereof, and which runners support, in the customary manner, bolsters 13. The front bolster 13 supports a beam 14 that is pivotally connected thereto by a king-bolt 15, which permits steering movement of the front runners 11. The parts thus far described are of standard and well known construction.

Pairs of leaf springs 16 support the frame 3 from the runners 11 and 12 and have their intermediate portions rigidly secured to the rear bolster 13 and beam 14 and their ends are attached to the frame by links 17. To draw the runners 11 and 12 over the roadbed from the frame 3, I connect the beam 14 to a bracket 18 on the under side of said frame by a link 16 and the rear runners are attached to said beam by a connection 20. The front runners 11 are steered in the same manner as the front wheels of an automobile by attaching the same rearward of the beam 14 to the lower end of the steering post 9 by a connection 21.

The vehicle is propelled, either forward or backward, from the engine by a pair of transverse axially alined traction drums 22 located at the rear of said vehicle, and each of the traction drums is provided with a shaft 23. To increase the traction of the drums 22, each thereof is provided with a plurality of radial blades 24. The traction drums 22 are rotated, either forward or backward, at will, by the transmission mechanism 8 which is connected to the inner ends of the shafts 23 in the customary manner. These two traction drums 22 are substantially as wide as the distance between the runners and are axially spaced apart only sufficiently to clear the differential mechanism 8, which is located therebetween. To increase the operative length of the traction blades 24, the inner ends thereof are extended beyond the respective ends of the drums 22 and are beveled from their longitudinal edges to said ends of the drum.

The outer ends of the shafts 23 are journaled in roller bearings mounted in the rear ends of a pair of bars 25, which constitute the side members of a push frame 26. These bars 25 embrace the frame 3, with freedom for vertical swinging movement, and their forward ends are pivoted to the outer ends of a pair of relatively long trunnions 27, as shown in the form of bolts. The trunnions 27 are secured to the side members of the frame 3 in axial alinement with the universal joint 7, project outward of said frame and are provided with heads to hold the bars 25 thereon. The bars 25 are further connected to the trunnions 27 by curved flat bars 28, the rear ends of which are riveted to said bars 25 and their front ends are connected to said trunnions close to the frame 3 by forming therein bores, through which the trunnions project. The purpose of the brace bars 28 is to relieve the pressure from the bars 25 on the outer ends of the trunnions 27 and transmit the same to said trunnions close to the side members of the frame. These brace bars 28 also hold the bars 25 laterally spaced from the frame, with freedom for vertical swinging movement.

To hold the traction drums 22 onto the roadbed with a variable pressure, there is mounted on the rear end of the frame 3 a transverse rock shaft 29, having an arm 30 that is connected to the latch lever 10 by a long rod 31. On the ends of the rock shaft 29, outward of the frame 3, is a pair of levers 32 having on their outer ends, which project upwardly and rearwardly, spring caps 33, which overlie spring seats 34 secured to the bars 25. Coiled springs 35 are attached to the spring caps 33 and spring seats 34. Obviously, by drawing backward on the lever 10, the springs 25 may be placed under the desired tension.

To hold the traction drums 22 against transverse movement of the roadbed, the rear ends of a pair of converging brace rods 36 are attached to a vertically swinging bracket 37 pivoted to a transverse tie member of the frame 3 in axial alinement with the trunnions 27. By pivoting the push frame 26 and its brace rods 36 to the frame 3 in alinement with the universal joint 7, the traction drums 22 are free for raising and lowering movements.

When the vehicle is traveling on a hard ice or snow roadbed, only the outer longitudinal edges of the traction blades 24 will cut therein, but when the vehicle is traveling in soft snow, the traction drums 22 may be depressed sufficiently to cause the blades 24 to enter their full width into the snow, and thereby afford a sufficient base of resistance to push the vehicle forward at the desired speed.

What I claim is:—

1. A motor-propelled vehicle including runners, a main frame supported from the runners, a push frame pivoted to the main frame for vertical swinging movement, a pair of axially alined traction drums having circumferentially spaced traction blades, the inner ends of which are extended beyond the inner ends of said traction drums to increase the traction surfaces thereof, the shafts of the traction drums being journaled in the push frame, a motor mounted on the main frame and having a driving shaft, and differential mechanism connecting the driving shaft to the drum shafts and located within the projecting inner ends of the traction blades.

2. A motor-propelled vehicle including runners, a main frame supported from the runners and having a pair of axially alined trunnions projecting outward from the sides thereof, a push frame having a pair of bars embracing the main frame and pivoted to the outer ends of the trunnions, and reinforcing bars secured to the bars of the push frame and pivotally connecting the same to the trunnions close to the sides of the main frame and also holding the bars of the push frame laterally spaced from the main frame.

In testimony whereof I affix my signature in presence of two witnesses.

HENRY SMEDSHAMMER.

Witnesses:
O. T. OLSON,
A. EGGEN.